US012261009B2

(12) United States Patent
Zhang et al.

(10) Patent No.: US 12,261,009 B2
(45) Date of Patent: Mar. 25, 2025

(54) TERMINAL COVER

(71) Applicant: FUJI ELECTRIC FA COMPONENTS & SYSTEMS CO., LTD., Konosu (JP)

(72) Inventors: Shuo Zhang, Saitama (JP); Takafumi Ono, Saitama (JP)

(73) Assignee: FUJI ELECTRIC FA COMPONENTS & SYSTEMS CO., LTD., Konosu (JP)

( * ) Notice: Subject to any disclaimer, the term of this patent is extended or adjusted under 35 U.S.C. 154(b) by 445 days.

(21) Appl. No.: 17/582,471

(22) Filed: Jan. 24, 2022

(65) Prior Publication Data

US 2022/0285105 A1 Sep. 8, 2022

(30) Foreign Application Priority Data

Mar. 5, 2021 (JP) ................................ 2021-035619

(51) Int. Cl.

| | |
|---|---|
| ***H01R 4/28*** | (2006.01) |
| ***H01H 9/02*** | (2006.01) |
| ***H01H 71/08*** | (2006.01) |

(52) U.S. Cl.

CPC .......... *H01H 9/0264* (2013.01); *H01H 71/08* (2013.01)

(58) Field of Classification Search

CPC ... H01H 9/0264; H01H 71/08; H01H 71/0207

See application file for complete search history.

(56) References Cited

U.S. PATENT DOCUMENTS

| | | | | |
|---|---|---|---|---|
| 2,727,965 A * | 12/1955 | Toth | H01H 9/0264 | 439/718 |
| 5,150,091 A * | 9/1992 | Hart | H01H 9/0264 | 200/293 |
| RE34,113 E * | 10/1992 | Miller | H01H 9/02 | 361/647 |
| 5,488,337 A * | 1/1996 | Hubbard | H01H 9/0264 | 335/8 |
| 5,811,749 A * | 9/1998 | Bausch | H01H 9/342 | 200/306 |
| 6,198,063 B1 * | 3/2001 | Kramer | H01H 9/342 | 200/306 |
| 8,698,023 B2 * | 4/2014 | Grunwald | H01H 9/0264 | 335/201 |
| 2002/0027489 A1 * | 3/2002 | Letient | H02B 1/14 | 335/202 |
| 2005/0057333 A1 * | 3/2005 | Subramanian | H01H 9/0264 | 335/202 |

(Continued)

FOREIGN PATENT DOCUMENTS

JP 2000-067728 A 3/2000

*Primary Examiner* — Abdullah A Riyami

*Assistant Examiner* — Nelson R. Burgos-Guntin

(74) *Attorney, Agent, or Firm* — HAUPTMAN HAM, LLP

(57) ABSTRACT

A terminal cover to cover a terminal to which an electric wire is to be connected, the terminal cover includes: an outer frame having an outer frame notch; and an inner frame provided within the outer frame notch in the outer frame, the inner frame having an inner frame notch smaller than the outer frame notch. Further, the outer frame and the inner frame are formed thinner than a peripheral portion and are connected to each other with cutoff portions that are bendable, twistable, or cuttable with a cutting tool, and the terminal is viewed through the inner frame notch.

9 Claims, 5 Drawing Sheets

(56) References Cited

U.S. PATENT DOCUMENTS

| | | | | |
|---|---|---|---|---|
| 2005/0109597 | A1* | 5/2005 | Etscheidt | H01H 9/0264 200/293 |
| 2005/0164564 | A1* | 7/2005 | Kawata | H01H 1/5855 439/793 |
| 2005/0280973 | A1* | 12/2005 | Kawata | H01H 9/0264 361/115 |
| 2008/0157906 | A1* | 7/2008 | Oh | H01H 71/08 335/202 |
| 2011/0209972 | A1* | 9/2011 | Eppe | H01H 71/08 200/293 |
| 2015/0129550 | A1* | 5/2015 | Pochopien | H01H 9/342 218/149 |
| 2016/0260560 | A1* | 9/2016 | Mishra | H01H 71/52 |
| 2017/0316893 | A1* | 11/2017 | Johnson | H01H 9/0264 |
| 2018/0082799 | A1* | 3/2018 | Zhang | H01H 9/0264 |

* cited by examiner

TERMINAL COVER

CROSS-REFERENCE TO RELATED APPLICATION(S)

The present application claims priority to and incorporates by reference the entire contents of Japanese Patent Application No. 2021-035619 filed in Japan on Mar. 5, 2021.

BACKGROUND

The present disclosure relates to a terminal cover.

A circuit breaker is installed in a power distribution panel or other components, and connects and disconnects terminals on the power supply side and terminals on the load side. The area around the terminals should be covered with a cover to prevent foreign objects, tools, fingers, or other objects (hereinafter referred to as "foreign objects or the like") from entering. The cover is provided with a notch for an electric wire to pass through, and the space between the notch and the electric wire should be sufficiently narrow to prevent foreign objects or the like from entering.

The terminal cover described in Japanese Laid-open Patent Publication No. 2000-067728 has a two-part structure including a first cover with a U-shaped notch groove on an end face through which an electric wire passes, and a second cover. An open end of the notch groove formed in the first cover is closed by the second cover, thereby narrowing the gap between the covers and the electric wire.

SUMMARY

There is a need for present disclosure has been made in view of the above problem, and is intended to provide a terminal cover that can be used universally for different diameters and numbers of electric wires to be connected.

According to an embodiment, a terminal cover to cover a terminal to which an electric wire is to be connected, includes: an outer frame having an outer frame notch; and an inner frame provided within the outer frame notch in the outer frame, the inner frame having an inner frame notch smaller than the outer frame notch. Further, the outer frame and the inner frame are formed thinner than a peripheral portion and are connected to each other with cutoff portions that are bendable, twistable, or cuttable with a cutting tool, and the terminal is viewed through the inner frame notch.

DETAILED DESCRIPTION

Meanwhile, depending on the site of use, electric wires of various diameters are used for the terminals of circuit breakers or other components, and the number of connected electric wires may be plural instead of one. The terminal cover described in Japanese Laid-open Patent Publication No. 2000-067728 is suitable for connecting electric wires of a fixed diameter to terminals, but to connect electric wires of different diameters or a plurality of electric wires, it is necessary to separately prepare a cover with specifically shaped notch grooves.

The following describes an embodiment of a terminal cover according to the present disclosure in detail with reference to the drawings. Note that the present disclosure is not limited by the present embodiment.

Figure 1:
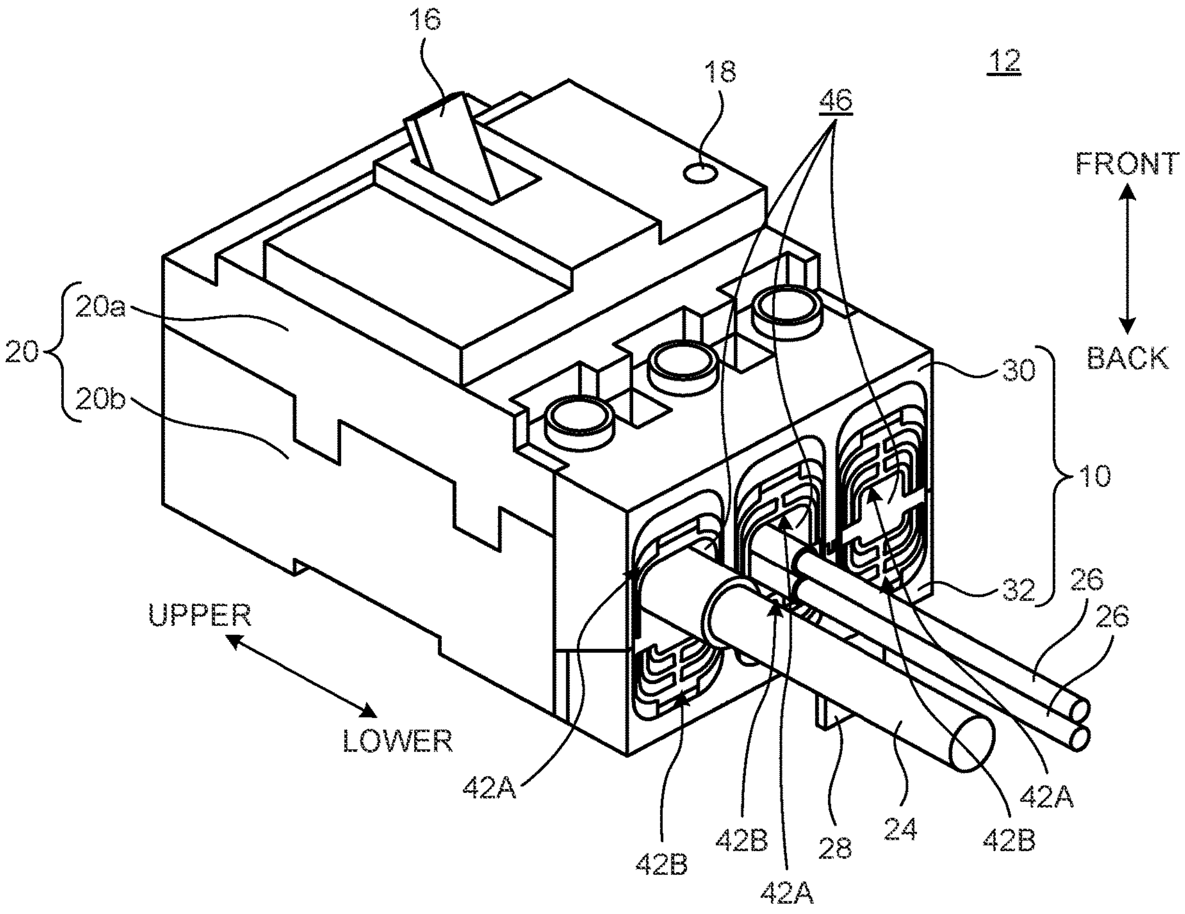
FIG. 1 is a perspective view of a circuit breaker including a terminal cover according to an embodiment of the present disclosure, viewed from ae oblique front side.
Figure 2:
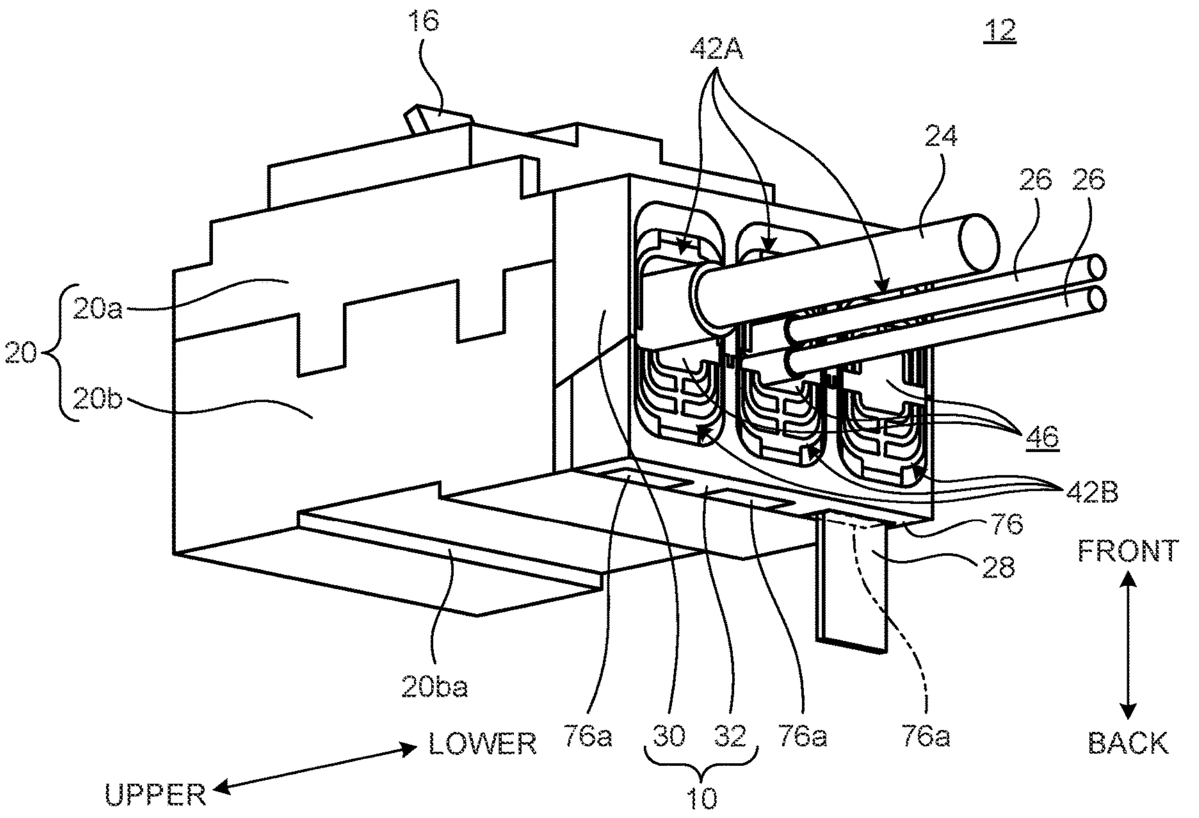
FIG. 2 is a perspective view of the circuit breaker including the terminal cover according to the embodiment of the present disclosure, viewed from an oblique back side.
Figure 3:
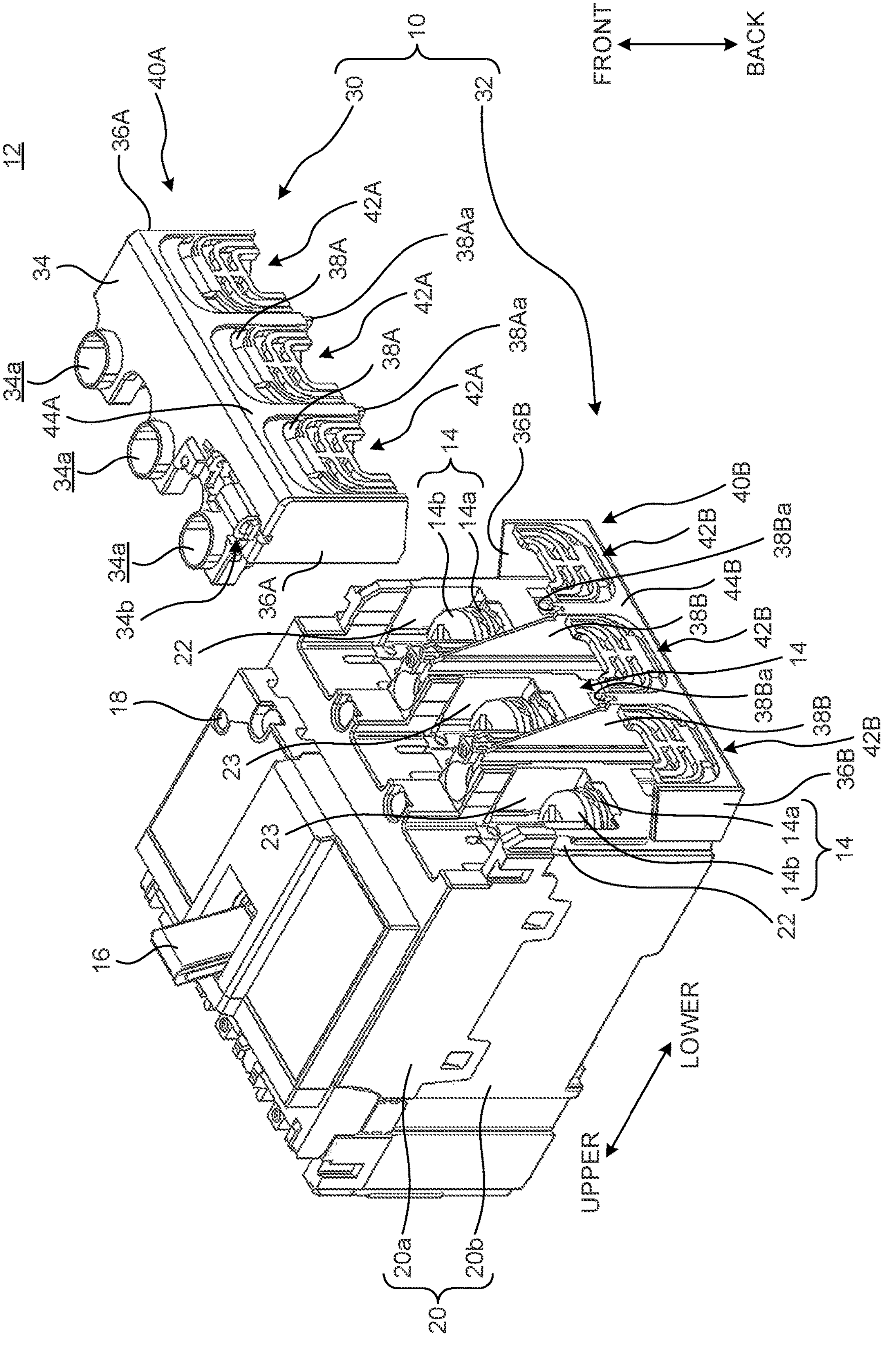
FIG. 3 is an exploded perspective view of the circuit breaker with a first cover removed.

FIG. 1 is a perspective view of a circuit breaker 12 including a terminal cover 10 according to the embodiment of the present disclosure, viewed from the oblique front side. FIG. 2 is a perspective view of the circuit breaker 12 viewed from the oblique back side. FIG. 3 is an exploded perspective view of the circuit breaker 12 with a first cover 30 removed. First, the following describes the circuit breaker 12.

The circuit breaker 12 is a molded case circuit breaker for wiring, an earth leakage breaker, or the like, and detects the flow of a large current and automatically shuts off an electric path. The circuit breaker 12 connects and disconnects between power supply side terminals and load side terminals 14 (hereinafter referred to simply as terminals 14). In each drawing, the power supply side terminals are at positions that are hidden and not visible.

In the following explanation, the side of the circuit breaker 12 where the power supply side terminals are installed is the upper side, and the side where the load side terminals 14 are installed is the lower side. The direction of the surface where a lever 16 is installed is the front side, and the opposite side is the back side. The front surface is a control surface, which also includes a trip button 18 and other components. In each drawing, these directions are indicated by arrows as appropriate. The notation indicating these directions is for convenience of explanation and does not limit the installation direction of the circuit breaker 12.

The circuit breaker 12 includes an arc extinguishing device, an opening/closing mechanism, a trip mechanism, and other components inside a body 20 covered by a front cover 20*a* and a back cover 20*b*. Three load side terminals 14 are provided in parallel at the lower part of the back cover 20*b*. The circuit breaker 12 is of a three-phase specification and has three terminals 14, but it may be a one-terminal type, two-terminal type, or four-terminal type. The three load side terminals 14 are covered by the terminal cover 10. Three power supply side terminals are provided in parallel at the upper part of the back cover 20*b*, but are not illustrated in the drawings. The terminal cover 10 may also be provided for the power supply side terminals. A mounting part 20*ba* on the back surface is configured to be attachable to a certain rail in a power distribution panel, for example.

As illustrated in FIG. 3, the terminals 14 are provided in respective areas partitioned by a pair of side walls 22 on both respective sides, and by intermediate partition walls 23 between the terminals 14. The side walls 22 are formed continuously from the back cover 20*b* to the front cover 20*a*. Each of the terminals 14 is of screw type and includes a base 14*a* and a screw 14*b* that is screwed into a screw hole of the base 14*a*. The screw 14*b* is screwed in toward the back side and is screwed out toward the front side. The terminal 14 can be screw-up or spring-loaded. The terminal 14 fixes and conducts an electric wire by tightening its electric wire terminal with the base 14*a* and a head of the screw 14*b*.

The terminal 14 can fix a thick electric wire 24, a thin electric wire 26, a bus bar 28, or other electric wires in accordance with a predetermined acceptable specification. The terminal 14 can fix a plurality of thin electric wires 26 (two electric wires in FIG. 1 and FIG. 2) stacked in the front-back direction together. The fixed electric wires 24 and 26 extend along the upper-lower direction in the vicinity of the terminals 14.

Next, the following describes the terminal cover 10.

The terminal cover 10 covers the three terminals 14 and has a two-part structure including the first cover 30 and a second cover 32. The first cover 30 and the second cover 32 are molded resin products and have an insulating property. Gaps between parts of the terminal cover 10 are sufficiently narrow to prevent foreign objects or the like from entering, protecting the terminals 14. A protection class of the terminal cover 10 is equivalent to IP20 as specified in JIS C 0920, for example.

The first cover 30 and the second cover 32 are used in combination with each other. The first cover 30 covers a front side part and a lower portion on the front side with respect to the terminals 14. The second cover 32 covers a back side part and a lower portion on the back side with respect to the terminals 14. For ease of understanding in the following description, the sign of an element in the first cover 30 will be marked with "A" as appropriate, and the sign of a corresponding element in the second cover 32 will be marked with "B" as appropriate. In the description of the terminal cover 10 by itself, the "front face" of the terminal cover 10 is the surface viewed from the lower side in the case illustrated in FIG. 1 to FIG. 3, that is, in the direction where the electric wires 24 and 26 extend.

The first cover 30 has a front wall (first wall) 34, a pair of side walls 36A, a pair of intermediate partition walls 38A, and a front face part 40A.

The front wall 34 covers the front side (in other words, the side in the direction in which the screws 14*b* screw out) of the three terminals 14 together. The front wall 34 has operating holes 34*a* corresponding to the three terminals. Each of the operating holes 34*a* is located at a position such that a rod-shaped instrument such as an electroscope or a screwdriver can be inserted and come into contact with a part of the terminal 14, allowing for operations such as power detection and retightening. The operating hole 34*a* has a cylindrical shape, with a function of guiding the rod-shaped instrument to be in a proper orientation to contact the head of the screw 14*b*, and the cylindrical shape. When an external operating handle device is installed on the front surface of the circuit breaker, the operating hole 34*a* has a function of preventing the rod-shaped instrument from contacting a mounting screw that mounts the external operating handle device to the circuit breaker, thus preventing a ground fault and an electric shock to an operator when the power is on. A snap-fit part 34*b* is an attachment part to the body 20.

The side walls 36A form extension faces of the side walls 22 and separate an external area from the terminals 14. The intermediate partition walls 38A form extension faces of the intermediate partition walls 23 and separate the terminals 14 from one another. Small projections 38Aa are provided on end parts of the intermediate partition walls 38A on the back side.

The front face part 40A is a part connected to the front wall 34 on the front side and to the side walls 36A on both sides, and has three electric wire diameter adjustment parts 42A, one for each terminal 14. The three electric wire diameter adjustment parts 42A are arranged parallel to the respective terminals 14. Areas of the front face part 40A other than the electric wire diameter adjustment parts 42A form an outer frame 44A.

The terminal cover 10 has insertion parts 46 (refer to FIG. 1 and FIG. 2) for the electric wires 24 and 26 to be inserted. The insertion parts 46 are provided individually for the three respective terminals 14 such that the terminals 14 can be viewed. The electric wire diameter adjustment parts 42A are parts that adjust the areas of the respective insertion parts 46 on the basis of the diameters and numbers of the electric wires 24 and 26 to be connected to the terminals 14.

Figure 4:
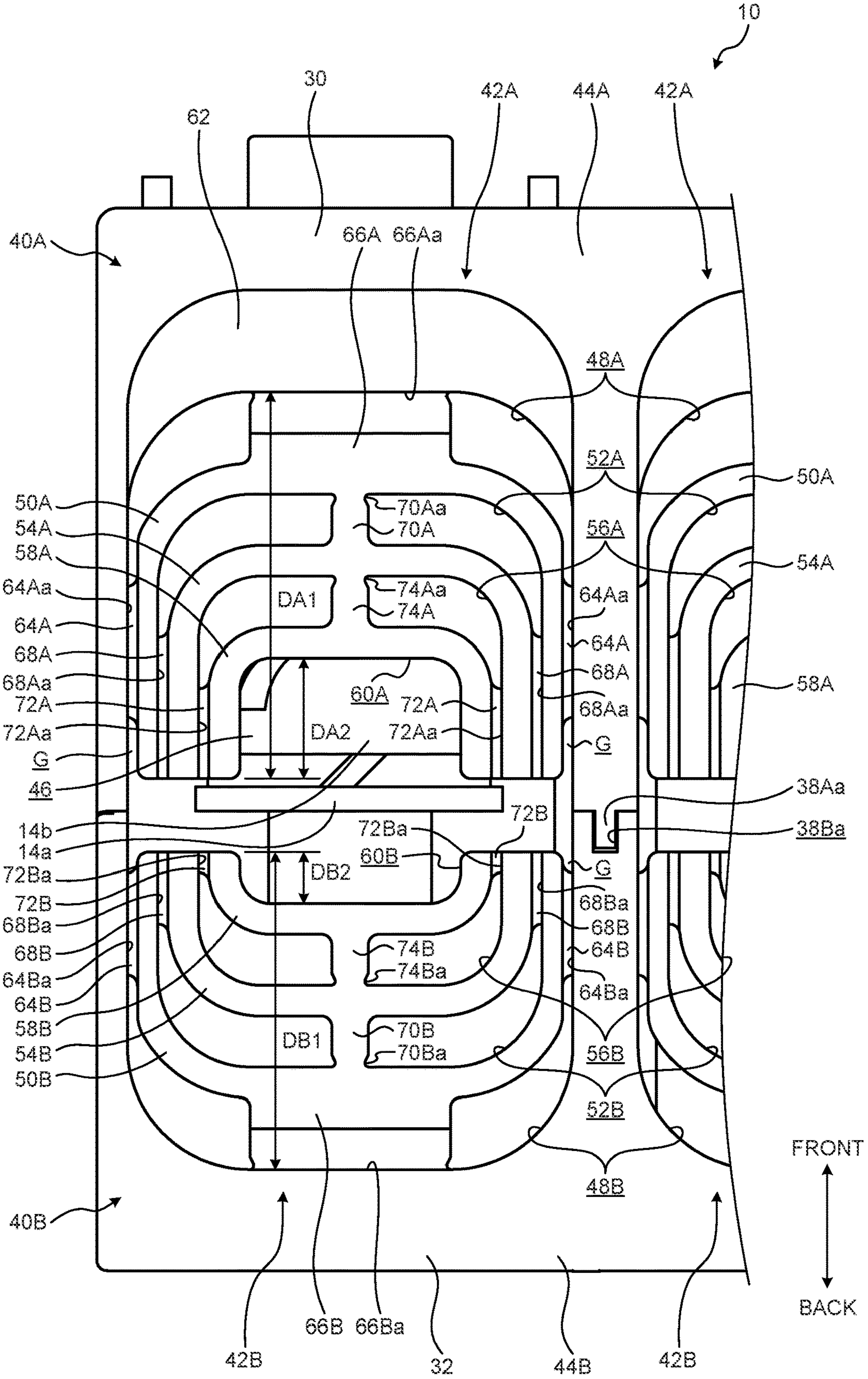
FIG. 4 is a front view of the terminal cover.

FIG. 4 is a front view of the terminal cover 10. As illustrated in FIG. 4, the electric wire diameter adjustment part 42A of the first cover 30 has an outer frame notch 48A formed in the outer frame 44A, a first inner frame 50A provided on the inner side of the outer frame notch 48A, a first inner frame notch (inner frame notch) 52A formed in the first inner frame (inner frame) 50A, a second inner frame 54A provided on the inner side of the first inner frame notch 52A, a second inner frame notch 56A formed in the second inner frame 54A, a third inner frame 58A provided on the inner side of the second inner frame notch 56A, and a third inner frame notch 60A formed in the third inner frame 58A. A fin 62 is provided between the most front side (the upper side in FIG. 4) of the outer frame notch 48A and the outer frame 44A. The fin 62 is a part to hang your finger on when removing the first cover 30 from the body 20.

The first inner frame 50A, the second inner frame 54A, and the third inner frame 58A are each U-shaped. The first inner frame 50A, the second inner frame 54A, and the third inner frame 58A are smaller in this order, each have a substantially similar shape and arranged in what is called a nested structure. The gap between the outer frame 44A and the first inner frame 50A, the gap between the first inner frame 50A and the second inner frame 54A, and the gap between the second inner frame 54A and the third inner frame 58A are each of approximately the same width, and are sufficiently narrow to prevent foreign objects or the like from entering.

The outer frame notch 48A, the first inner frame notch 52A, the second inner frame notch 56A, and the third inner frame notch 60A are each of a substantially similar U-shape and open to the back side (lower side in FIG. 4). The outer frame notch 48A, the first inner frame notch 52A, the second inner frame notch 56A, and the third inner frame notch 60A are smaller in this order.

The first inner frame 50A is connected to the outer frame 44A at three locations: a pair of opening connection pieces 64A and 64A at both end positions on the opening side (lower side in FIG. 4) of the outer frame notch 48A, and a recessed side connection piece 66A at the most recessed part, thereby ensuring moderate connection strength and stability. Each of the opening connection pieces 64A is provided at a position slightly more recessed than the position of an end of the outer frame notch 48A on the opening side, forming a gap G. The gap G is made by cutting a side portion short so that the side portion can be cut off with less force when it is separated with a cutting tool described below. The first inner frame 50A is connected to the outer frame 44A through the fin 62 by the recessed side connection piece 66A at the most recessed part.

The opening connection pieces 64A have cutoff portions 64Aa and the recessed side connection piece 66A has a cutoff portion 66Aa. The cutoff portions 64Aa and 66Aa are thinner than the thickness of the first inner frame 50A and the outer frame 44A in the upper-lower direction (the direction perpendicular to the sheet of FIG. 4), and are formed to be cuttable with a cutting tool that do not require power, such as a nipper, cutter, or the like. The cutoff portions 64Aa and 66Aa may be thinner than at least the surrounding areas to the extent that the cutoff portions can be cut off with the cutting tool. The cutoff portions 64Aa and 66Aa maintain a moderate strength when not cut off. The same applies to other cutoff portions described below. When the three cutoff portions 64Aa, 64Aa, and 66Aa are cut off, the first inner frame 50A is separated from the outer frame 44A.

The connection between the first inner frame 50A and the second inner frame 54A, and the connection between the second inner frame 54A and the third inner frame 58A are also made in the same way as the connection between the outer frame 44A and the first inner frame 50A. The second inner frame 54A is connected to the first inner frame 50A at three locations: a pair of opening connection pieces 68A and 68A on the opening side of the first inner frame notch 52A, and a recessed side connection piece 70A at the most recessed part. The third inner frame 58A is connected to the second inner frame 54A at three locations: a pair of opening connection pieces 72A and 72A on the opening side of the second inner frame notch 56A, and a recessed side connection piece 74A at the most recessed part.

The opening connection pieces 68A, the recessed side connection piece 70A, the opening connection pieces 72A, and the recessed side connection piece 74A have cutoff portions 68Aa, 70Aa, 72Aa, and 74Aa, respectively. These cutoff portions 68Aa, 70Aa, 72Aa, 74Aa have such a thickness that the cutoff portions can be cut with a cutting tool in the same way as the above cutoff portions 64Aa and 66Aa, but the size, orientation or shape of the former differs from the latter at some portions for reasons of parts molding. Specifically, the cutoff portions 64Aa, 66Aa, 68Aa, 72Aa are thin in the direction perpendicular to the sheet surface of FIG. 4, while the cutoff portions 70Aa and 74Aa are thin in the left-right direction of FIG. 4.

Figure 5:
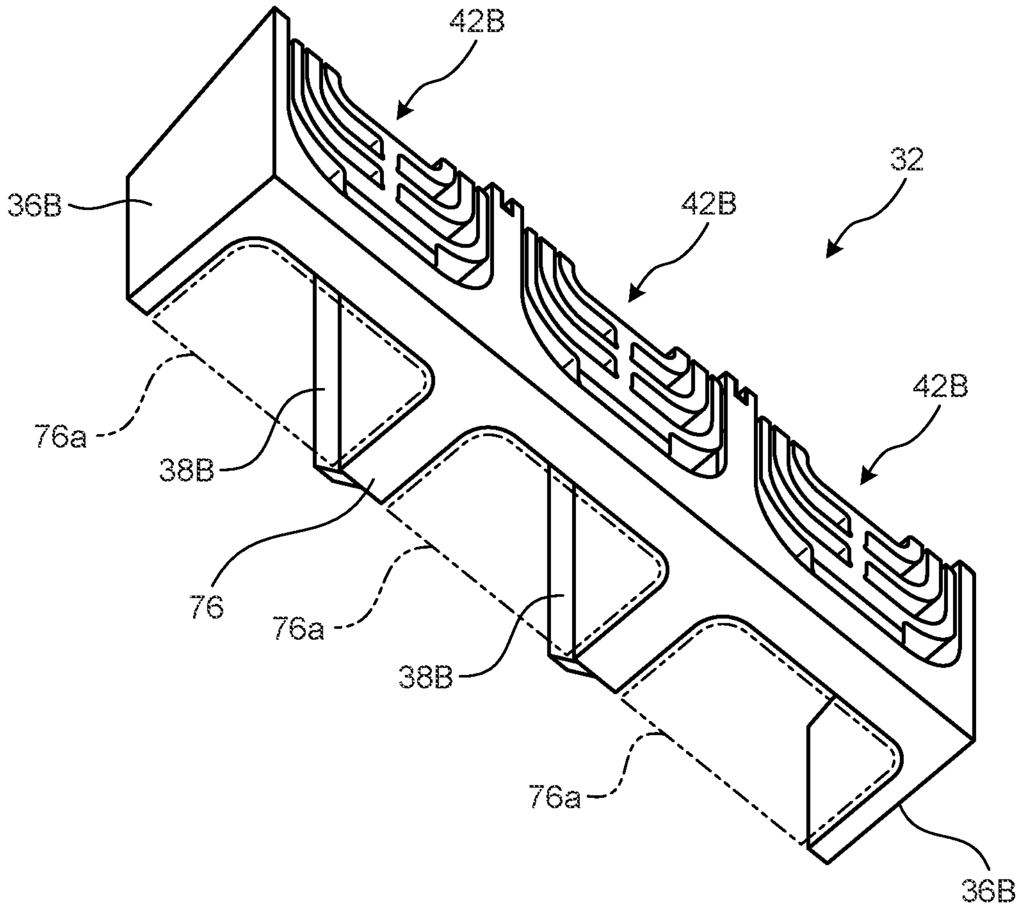
FIG. 5 is a perspective view of a second cover viewed from an oblique back side.

Next, the following describes the second cover 32. FIG. 5 is a perspective view of the second cover 32 viewed from the oblique back side. As illustrated in FIG. 2, FIG. 3, and FIG. 5, the second cover 32 has a back wall (second wall) 76, a pair of side walls 36B, a pair of intermediate partition walls 38B, and a front face part 40B. The back wall 76 covers the back side (in other words, the side in the direction in which the screws 14*b* screw in) of the three terminals 14 together. The back wall 76 includes thinly formed cutoff walls 76*a* on the back side of the three respective screws 14*b*.

The cutoff walls 76*a* are formed to be cuttable with a cutting tool that does not require power. The bus bar 28 can be inserted from the area where the corresponding cutoff wall 76*a* is cut off from the back wall 76 (refer to the virtual lines in FIG. 2 and FIG. 5) and connected to the terminal 14. The area where the cutoff wall 76*a* is cut off opens to the upper side illustrated by the arrow in FIG. 2, allowing the second cover 32 to be attached and removed with the bus bar 28 connected to the terminal 14. In general, the bus bar 28 is installed in a distribution panel such that the bus bar 28 extends on the back surface side of the circuit breaker 12. Thus, the connection can be made easier by enabling the bus bar 28 to be inserted through the area where the cutoff wall 76*a* of the back wall 76 is cut off. At least a part of the back wall 76 may be formed as the cutoff wall 76*a* on the basis of the cross-sectional area of a conductive material, such as the bus bar 28, that is expected to be connected.

The side walls 36B form extension faces of the side walls 22 and separate the external area from the terminals 14. The intermediate partition walls 38B partially overlap the intermediate partition walls 38A described above to form extension faces of the intermediate partition walls 23 and separate the terminals 14 from one another. Small depressions 38Ba are formed in end parts of the intermediate partition walls 38B on the front side. The projections 38Aa described above fit into the respective depressions 38Ba and stabilize.

The front face part 40B is a part connected to the back wall 76 on the back side and to the side walls 36B on both sides, and has three electric wire diameter adjustment parts 42B, one for each terminal 14. The three electric wire diameter adjustment parts 42B are arranged parallel to the respective terminals 14. Areas of the front face part 40B other than the electric wire diameter adjustment parts 42B form an outer frame 44B.

As illustrated in FIG. 4, the electric wire diameter adjustment part 42B is basically symmetrical in shape to the electric wire diameter adjustment part 42A described above in the front-back direction, except for the details. The components of the electric wire diameter adjustment part 42B are marked with “B” where the components of the electric wire diameter adjustment part 42A described above are marked with “A”, enabling the correspondence to be identified, and thus individual detailed explanations are omitted.

Each notch in the electric wire diameter adjustment part 42A of the first cover 30 is deeper than the corresponding notch in the electric wire diameter adjustment part 42B of the second cover 32. For example, a cut depth DA1 of the outer frame notch 48A is deeper than a cut depth DB1 of the outer frame notch 48B, and a cut depth DA2 of the third inner frame notch 60A is deeper than a cut depth DB2 of the third inner frame notch 60B. In the electric wire diameter adjustment part 42B, the fin 62 described above is omitted.

The terminal cover 10 has a two-part structure including the first cover 30 and the second cover 32. The first cover 30 and the second cover 32 have the outer frame notches 48A and 48B facing each other, the first inner frame notches 52A and 52B facing each other, the second inner frame notches 56A and 56B facing each other, and the third inner frame notches 60A and 60B facing each other.

In the initial state where none of the first inner frames 50A and 50B, the second inner frames 54A and 54B, and the third inner frames 58A and 58B are cut off as illustrated in FIG. 4, the innermost third inner frame notches 60A and 60B face each other to form the insertion part 46. In this state, the terminal 14 can be viewed through the insertion part 46, and one thin electric wire 26, although not illustrated in the drawing, can be inserted and connected. In this case, the area of the insertion part 46 is reasonably narrow, so that the gap between one thin electric wire 26 and the third inner frame notches 60A and 60B is sufficiently narrow to prevent foreign objects or the like from entering.

As described above, it is also possible to fix a plurality of thin electric wires 26 together to the terminal 14 by stacking the electric wires 26 in the front-back direction. However, when two thin electric wires 26 are stacked on each other and fixed to the terminals 14 for example, the width of the electric wires 26 in the front-back direction becomes thicker accordingly and the electric wires 26 cannot pass through the insertion part 46 in the initial state where the third inner frame notches 60A and 60B are formed facing each other.

Therefore, in the part of the middle one of the three insertion parts 46 in FIG. 1 and FIG. 2, where the two thin electric wires 26 are inserted, the third inner frame 58A of the electric wire diameter adjustment part 42A in the first cover 30 is cut off and the area is slightly larger. The third inner frame 58A is cut off from the second inner frame 54A by cutting the cutoff portions 72Aa, 72Aa, and 74Aa. In other words, the insertion part 46 here is formed by the second inner frame notch 56A and the third inner frame notch 60B.

When two electric wires 26 are stacked on each other, the dimension becomes larger by one electric wire toward the front side than in the case of one electric wire 26, and cutting off the third inner frame 58A in the first cover 30 on the front side enables the insertion part 46 to have an area where exactly two electric wires 26 can be inserted. Therefore, the gap between the two thin electric wires 26 and the second and third inner frame notches 56A and 60B is sufficiently narrow to prevent foreign objects from entering. However, depending on working conditions and judgment of the operator, the third inner frame 58B on the back side may be cut off instead of the third inner frame 58A on the front side, allowing for flexibility according to the site.

It is also possible to fix a thick electric wire 24 to the terminal 14 as described above. However, the thick electric wire 24 is even larger in diameter than the two thin electric wires 26 are, and cannot pass through the insertion part 46 formed by the second inner frame notch 56A and the third inner frame notch 60B.

Therefore, in the part of the left one of the three insertion parts 46 in FIG. 1 and FIG. 2, where the one thick electric wire 24 is inserted, the second inner frame 54A of the electric wire diameter adjustment part 42A in the first cover 30 is cut off and the area is larger. The second inner frame 54A is cut off from the first inner frame 50A by cutting the cutoff portions 68Aa, 68Aa, and 70Aa. In other words, the insertion part 46 here is formed by the first inner frame notch 52A and the third inner frame notch 60B.

Since the thick electric wire 24 has a larger dimension toward the front side than in the case of the two thin electric wires 26, cutting off the second inner frame 54A in the first cover 30 on the front side enables the insertion part 46 to have an area where exactly one electric wire 24 can be inserted. Therefore, the gap between the one thick electric wire 24 and the first and third inner frame notches 52A and 60B is sufficiently narrow to prevent foreign objects from entering. However, depending on working conditions and judgment of the operator, the second inner frame 54B on the back side may be cut off instead of the second inner frame 54A on the front side, allowing for flexibility according to the site.

When fixing an electric wire even thicker than the electric wire 24 to the terminal 14, although the illustration is omitted, an even larger area of the insertion part 46 may be secured by cutting off the first inner frame 50A from the outer frame 44A or cutting off the first inner frame 50B from the outer frame 44B.

As described above, in the terminal cover 10, the outer frames 44A and 44B and the first inner frames 50A and 50B, as well as each of the first inner frame 50A and 50B, the second inner frame 54A and 54B, and the third inner frame 58A and 58B, are connected by three notches respectively, which can be cut with a cutting tool. This configuration allows the first inner frames 50A and 50B, the second inner frames 54A and 54B, and the third inner frames 58A and 58B to be cut off from the adjacent outer frames.

By selecting how to cut out the third inner frames 58A and 58B, the second inner frames 54A and 54B, and the first inner frames 50A and 50B, the insertion part 46 of various areas can be formed with the third inner frame notches 60A and 60B, the second inner frame notches 56A and 56B, the first inner frame notches 52A and 52B, or the outer frame notches 48A and 48B. The terminal 14 can be viewed through the insertion part 46, the diameter and number of electric wires can be applied universally depending on the area of the insertion part 46, and the gap between the electric wire and the notches can be made sufficiently narrow to prevent foreign objects or the like from entering.

The terminal cover 10 includes the first cover 30 on the front side and the second cover 32 on the back side, bordered by the insertion parts 46, and the first cover can be removed individually from the front face side even after the electric wires are connected to the terminals 14, which provides excellent workability.

Note that, the terminal cover 10 includes the two covers of the first cover 30 and the second cover 32 from which inner frames can be individually cut off, providing improved flexibility; however, depending on the design conditions, the electric wire diameter adjustment part 42B of the second cover 32 may be omitted, and an electric wire diameter may be adjusted using only the electric wire diameter adjustment part 42A of the first cover 30.

Although the first cover 30 has three inner frames that can be cut off: the first inner frame 50A, the second inner frame 54A, and the third inner frame 58A, a reasonable electric wire diameter adjustment function can be provided by at least the first inner frame 50A alone. Conversely, an even smaller fourth or fifth inner frame may be provided on the inner side the third inner frame 58A.

Each of the above cutoff portions is described as a form that is cut with a cutting tool, but may be formed to be cuttable by bending or twisting by hand, depending on the design conditions.

In a terminal cover according to the present disclosure, an outer frame is connected to an inner frame by a notch portion in a cuttable manner, and the inner frame can be cut off. The area of an insertion part through which an electric wire passes can be adjusted depending on whether the inner frame is cut off, and the terminal cover can be used universally for different diameters and numbers of electric wires to be connected.

According to an embodiment, it is possible to use the terminal cover in accordance with the number and the diameters of the cables to be connected.

According to an embodiment, it is possible to provide the terminal cover to further correspond to the number and the diameters of the cables to be connected.

According to an embodiment, it is possible to more reliably protect the terminal.

According to an embodiment, it is possible to attach a bus bar or the like in a screwing direction of a screw of the screw type terminal.

According to an embodiment, it is possible to detect electricity and further tightening the terminal According to an embodiment, due to the nested structures, it is possible to more flexibly correspond to various cables.

According to an embodiment, due to the structure where the inner frame is connected to the outer frame at three locations, it is possible to have appropriate connection strength and stability.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal cover to cover a terminal to which an electric wire is to be connected, the terminal cover comprising:

an outer frame having an outer frame notch;

an inner frame provided within the outer frame notch in the outer frame, the inner frame having an inner frame notch smaller than the outer frame notch;

a pair of first opening connection pieces connecting two end portions of the inner frame to the outer frame, respectively; and a first recessed side connection piece extending, through the outer frame notch from a middle portion of the inner frame to the outer frame, and connecting the middle portion of the inner frame and the outer frame, wherein each of the first recessed side connection piece and the pair of first opening connection pieces includes a cutoff portion having a thickness less than each of the outer frame and the inner frame, the cutoff portions configured to be bendable, twistable, or cuttable with a cutting tool, and the terminal is viewed through the inner frame notch.

2. The terminal cover according to claim 1, wherein the terminal cover has a two-part structure including a first cover and a second cover, the first cover and the second cover each have the outer frame and the inner frame, openings of the outer frame notch and the inner frame notch in the first cover and openings of the outer frame notch and the inner frame notch in the second cover being configured to face each other.

3. The terminal cover according to claim 2, wherein the terminal is of screw type, the first cover includes a first wall covering a side in a direction in which a screw is screwed out, and the second cover includes a second wall covering a side in a direction in which a screw is screwed in.

4. A terminal cover according to claim 3, wherein at least a portion of the second wall is removable.

5. The terminal cover according to claim 3, wherein the first wall has an operating hole formed therein through which a rod-shaped instrument comes into contact with the terminal.

6. The terminal cover according to claim 1, wherein the inner frame includes a plurality of frames of different sizes in a nested structure, the frames adjacent to each other being connected by a further cutoff portion.

7. The terminal cover according to claim 1, wherein the terminal is of a circuit breaker.

8. The terminal cover according to claim 1, wherein the inner frame has a U-shape.

9. The terminal cover according to claim 1, further comprising:

a second inner frame at an inner side of the inner frame, wherein the second inner frame has a U-shape and is spaced apart from the inner frame, through the inner frame notch, a pair of second opening connection pieces connecting two end portions of the second inner frame to the two end portions of the inner frame, respectively, and a second recessed side connection piece extending, through the inner frame notch, from a middle portion of the second inner frame to the middle portion of the inner frame, and connecting the middle portion of the second inner frame and the middle portion of the inner frame.

* * * * *